(12) United States Patent
Klar

(10) Patent No.: US 11,022,408 B2
(45) Date of Patent: Jun. 1, 2021

(54) DRONE INTERCEPTOR SYSTEM, AND METHODS AND COMPUTER PROGRAM PRODUCTS USEFUL IN CONJUNCTION THEREWITH

(71) Applicant: Elta Systems Ltd., Ashdod (IL)

(72) Inventor: Gil Klar, Yavne (IL)

(73) Assignee: ELTA SYSTEMS LTD., Ashdod (IL)

( * ) Notice: Subject to any disclaimer, the term of this patent is extended or adjusted under 35 U.S.C. 154(b) by 161 days.

(21) Appl. No.: 16/352,486

(22) Filed: Mar. 13, 2019

(65) Prior Publication Data
US 2019/0285388 A1 Sep. 19, 2019

(30) Foreign Application Priority Data
Mar. 13, 2018 (IL) .......................................... 258077

(51) Int. Cl.
*F41H 13/00* (2006.01)
*B64C 39/02* (2006.01)
(Continued)

(52) U.S. Cl.
CPC ....... *F41H 13/0006* (2013.01); *B64C 39/024* (2013.01); *F41G 9/002* (2013.01);
(Continued)

(58) Field of Classification Search
CPC ...... F41H 10/0006; F41H 11/02; F41H 11/04; B64C 39/024; B64C 2201/108;
(Continued)

(56) References Cited

U.S. PATENT DOCUMENTS 8,602,303 B1 * 12/2013 Ding ......................... F41G 3/08
235/400
9,085,362 B1 * 7/2015 Kilian ....................... B64F 1/02
(Continued)

FOREIGN PATENT DOCUMENTS

CN 106679507 A 5/2017
CN 107054678 A 8/2017
(Continued)

OTHER PUBLICATIONS

Camera Drones Are Weak Against Confetti and Toilet Paper (Jul. 18, 2017): https://petapixel.com/2017/07/18/beware-camera-drones-weak-confetti-toilet-paper/.
(Continued)

*Primary Examiner* — Marthe Y Marc-Coleman
(74) *Attorney, Agent, or Firm* — Browdy and Neimark, PLLC

(57) ABSTRACT

A system operative to down a target drone having propellers deployed along a perimeter p, comprising a processor-controlled interceptor drone bearing a processor-controlled flexible elongate intercepting agent cannon and an onboard camera; and an onboard processor to receive sensed wind conditions and to a firing distance d, between interceptor and target drones, given a firing angle A, and wherein the processor is configured to track the target drone using imagery generated by the onboard camera including at least once, when said wind conditions exist, guiding the interceptor drone to a firing position whose distance from the target drone is d, and commanding the cannon to fire at firing angle A, once said firing position is achieved, thereby to use the flexible elongate intercepting agent to down target drones.

15 Claims, 10 Drawing Sheets

| Wind speed | No-wind e.g. 0-5 km/h | Light wind e.g. 5-15 km/h | Strong wind e.g. 15-40km/h |
|---|---|---|---|
| Horizontal range | 6-10m | 8-12m | 12-20m |
| Vertical distance | 4-6m | 2-4m | 4-6m |
| Direction of approach | any | With the wind (e.g.: wind blows east -> fire east) | With the wind (e.g.: wind blows east --> fire east) |
| Firing angle | horizontal | Slightly tilted down (~ 10 deg) | Tilted down (~ 20 deg) |

(51) Int. Cl.
*F41G 9/00* (2006.01)
*F42B 30/00* (2006.01)
*G01P 5/00* (2006.01)
*G05D 1/00* (2006.01)
*F41H 11/02* (2006.01)
*F41H 11/04* (2006.01)
*A63H 37/00* (2006.01)

(52) U.S. Cl.
CPC .............. *F41H 11/02* (2013.01); *F41H 11/04* (2013.01); *F42B 30/00* (2013.01); *G01P 5/001* (2013.01); *G05D 1/0094* (2013.01); *A63H 37/00* (2013.01); *B64C 2201/108* (2013.01); *B64C 2201/127* (2013.01)

(58) Field of Classification Search
CPC ........... B64C 2201/127; B64C 2201/12; F41G 9/002; F42B 30/00; G01P 5/001; G05D 1/0094; A63H 37/00
USPC .............................................. 701/3; 235/411
See application file for complete search history.

(56) References Cited

U.S. PATENT DOCUMENTS

| 10,930,162 | B2 | 2/2021 | Sasao |
| 2016/0129363 | A1 | 5/2016 | Wong et al. |
| 2016/0376029 | A1 | 12/2016 | Sekiya |
| 2017/0144756 | A1 | 5/2017 | Rastgaar Aagaah et al. |
| 2017/0356726 | A1 | 12/2017 | Theiss et al. |
| 2018/0335779 | A1* | 11/2018 | Fisher ................ B64C 39/024 |
| 2019/0068953 | A1* | 2/2019 | Choi ..................... G01B 11/25 |

FOREIGN PATENT DOCUMENTS

| DE | 10 2015 008255 A1 | 12/2016 |
| GB | 2537664 A | 10/2016 |
| JP | 2016/215874 A | 12/2016 |
| KR | 2016 0071027 | 6/2016 |
| WO | 2016/170367 A1 | 10/2016 |
| WO | 2017216854 A1 | 12/2017 |

OTHER PUBLICATIONS

Rapere: An Intercept Drone to Seek and Destroy Other Drones (Jan 14, 2015): http://spectrum.ieee.org/automaton/robotics/drones/rapere-intercept-drone.

The SkyWall 100 bazooka captures drones with a giant net (Mar. 4, 2016): http://techcrunch.com/2016/03/04/the-skywall-100-bazooka-captures-drones-with-a-giant-net/.

Levin, D., Daser, G., Shpund, Z., Levin, D., Daser, G., & Shpund, Z. (1997). On the aerodynamic drag of ribbons. In 14th Aerodynamic Decelerator Systems Technology Conference (p. 1525).

* cited by examiner

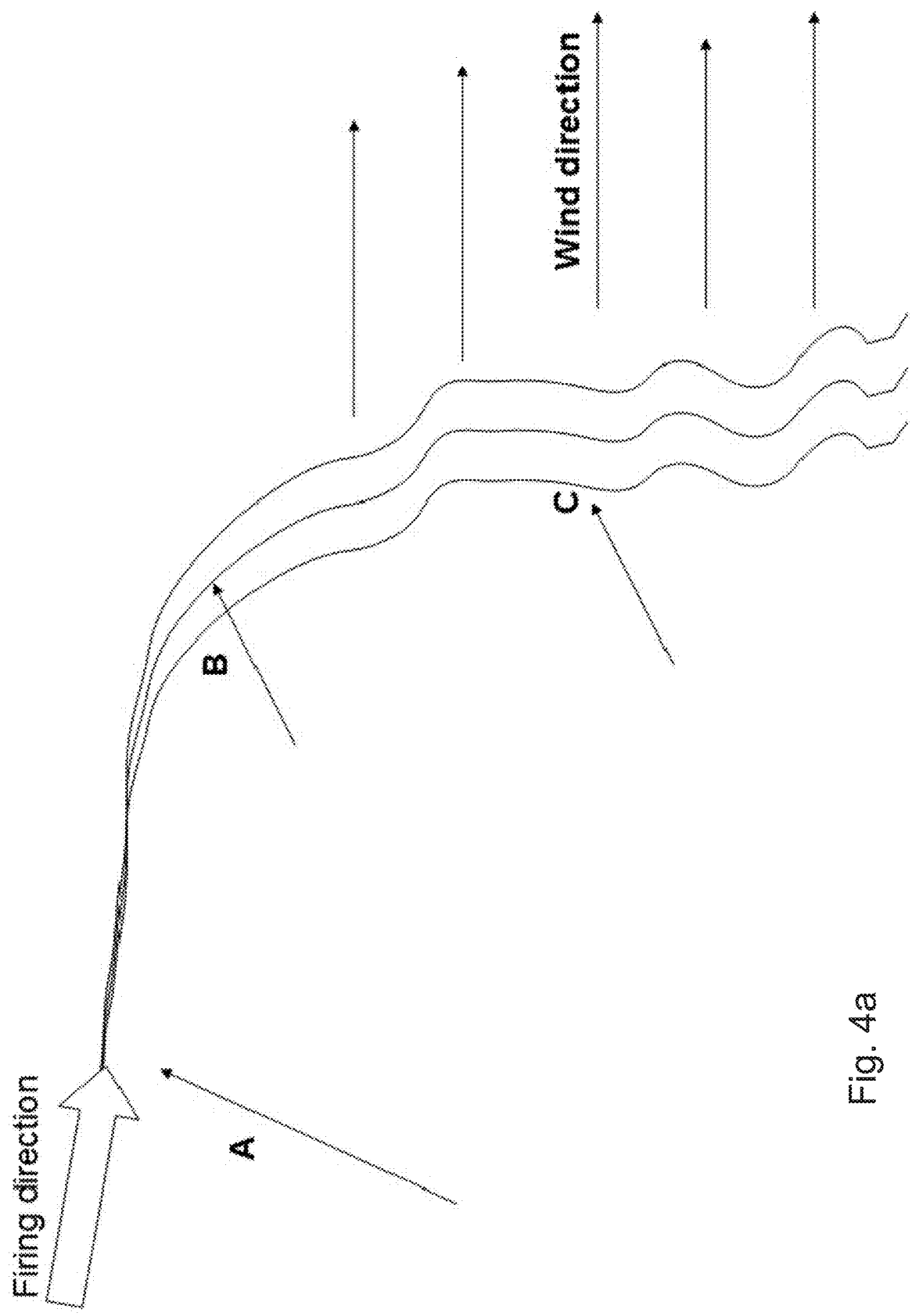

Fig. 5

Compute absolute target position (Az/El) from GPS position

Tgt_az_relative = Tgt_az_absolute – Own_heading

If target_az_relative > HFOV/2

Set absolute_yaw = target_az_absolute

Do:

Compute absolute target position (Az/El) from GPS position

Tgt_az_relative = Tgt_az_absolute – own_heading

[Pixel_az, Pixel_el] =

Pos2PixelAzEl(Tgt_az_relative, Tgt_el, roll, pitch, yaw=0)

[Pixel_x, Pixel_y] = PixelAzEl2PixelXY(Pixel_Az, Pixel_el)

Assign window centered at [Pixel_x, Pixel_y], with size [Acq_win_width, Acq_win_height]

Assign reference window centered at [Pixel_x, Pixel_y], with size [Acq_win_width*3, Acq_win_height*3]

Run detection algorithm within the tracking window area

While no_tracking

Fig. 6

|  | Type 40 | Type 80 |
|---|---|---|
| Canister (aka barrel) Length | 40 cm | 80 cm |
| Gas cylinder weight | 150 gr | 250 gr |
| # of streamer rolls in cannon | 20 | 20 |
| Streamer roll diameter | 2 cm | 2 cm |
| Streamer width | 1 cm | 2 cm |
| Streamer length | 10m | 10m |
| Firing range | 6-10m | 8-15m |
| Firing method | Electric/ manual | Electric/ manual |
| Cannon Diameter | 50mm | 50mm |

Fig. 7a

| Wind speed | No-wind e.g. 0-5 km/h | Light wind e.g. 5-15 km/h | Strong wind e.g. 15-40km/h |
|---|---|---|---|
| Horizontal range | 6-10m | 8-12m | 12-20m |
| Vertical distance | 4-6m | 2-4m | 4-6m |
| Direction of approach | any | With the wind (e.g.: wind blows east -> fire east) | With the wind (e.g.: wind blows east --> fire east) |
| Firing angle | horizontal | Slightly tilted down (~ 10 deg) | Tilted down (~ 20 deg) |

Fig. 7b

| Wind speed | No-wind 0-5 km/h | Light wind 5-15 km/h |
|---|---|---|
| Horizontal range | 4-8m | 6-10m |
| Vertical distance | 2-4m | 1-3m |
| Direction of approach | any | With the wind (e.g.: wind blows east -> fire east) |
| Firing angle | horizontal | Tilted down (~ 15 degrees) |

DRONE INTERCEPTOR SYSTEM, AND METHODS AND COMPUTER PROGRAM PRODUCTS USEFUL IN CONJUNCTION THEREWITH

REFERENCE TO CO-PENDING APPLICATIONS

None.

FIELD OF THIS DISCLOSURE

The present invention relates generally to drones and more particularly to drones with propellers.

BACKGROUND FOR THIS DISCLOSURE

Conventional technology constituting background to certain embodiments of the present invention is described in the following publications inter alia:

The following publication https://petapixel.com/2017/07/18/beware-camera-drones-weak-confetti-toilet-paper/ teaches that Camera Drones Are Weak Against Confetti and Toilet Paper.

The following patent document: US2016129363 (A1) describes air delivered special effects.

The following http://spectrum.ieee.org/automaton/robotics/drones/rapere-intercept-drone describes Rapere: an intercept drone to seek and destroy other drones.

The following publication http://techcrunch.com/2016/03/04/the-skywall-100-bazooka-captures-drones-with-a-giant-net/ : The SkyWall 100 bazooka captures drones with a giant net.

The following patent document: WO2016170367 (A1) describes a system for deploying a first object for capturing, immobilizing or disabling a second object.

The following patent document: GB 2537664 (A) describes a system for tangling a vehicle.

The following patent document: US2017356726 (A1) describes an aerial arresting system for an unmanned aerial vehicle.

The following patent document: US2017144756 (A1) describes a drone having a drone-catching feature.

The following patent document: US2016376029 (A1) describes a small unmanned air vehicle repulsing apparatus.

The following patent document CN106679507 (A) describes soft-damage ammunition.

The following patent document: CN107054678 (A) describes a vehicle-mounted anti-unmanned-aerial-vehicle net bullet interception system.

The following patent document: JP2016215874 (A) describes a capture device.

The following publication https://arc.aiaa.org/doi/abs/10.2514/6.1997-1525 describes use of ribbons tied at one end, and tied at both ends.

The disclosures of all publications and patent documents mentioned in the specification, and of the publications and patent documents cited therein directly or indirectly, are hereby incorporated by reference. Materiality of such publications and patent documents to patentability is not conceded.

SUMMARY OF CERTAIN EMBODIMENTS

Certain embodiments seek to provide a method for systematic use of free-floating flexible agents to entangle a target e.g. by ejecting the agents at a suitable distance e.g. perhaps 6-20 meters, from a target which may be moving. Typically, the agents are shot when rolled up, such that, initially, their mass is concentrated and their velocity is generally along the firing vector determined by the firing angle which may be close to the horizontal, e.g. as described herein.

Certain embodiments of the present invention seek to provide circuitry typically comprising at least one processor in communication with at least one memory, with instructions stored in such memory executed by the processor to provide functionalities which are described herein in detail. Any functionality described herein may be firmware-implemented or processor-implemented as appropriate.

It is appreciated that any reference herein to, or recitation of, an operation being performed is, e.g. if the operation is performed at least partly in software, intended to include both an embodiment where the operation is performed in its entirety by a server A, and also to include any type of "outsourcing" or "cloud" embodiments in which the operation, or portions thereof, is or are performed by a remote processor P (or several such), which may be deployed off-shore or "on a cloud", and an output of the operation is then communicated to, e.g. over a suitable computer network, and used by, server A. Analogously, the remote processor P may not, itself, perform all of the operations and, instead, the remote processor P itself may receive output/s of portion/s of the operation(s) from yet another processor/s P', may be deployed off-shore relative to P, or "on a cloud", and so forth.

Thus, the present invention typically includes at least the following embodiments:

Embodiment 1. A system operative to down a target drone having propellers deployed along a perimeter p, the system comprising:

a processor-controlled interceptor drone bearing at least one processor-controlled flexible elongate intercepting agent cannon and at least one onboard camera; and an onboard processor operative to receive sensed wind conditions and to determine a firing distance d, between the interceptor and target drones, given a firing angle A, wherein the firing distance d is:

pre-known, given at least wind conditions, to be large enough to allow at least a first predetermined amount of flexible elongate intercepting agents streamer rolls fired by the cannon to each unravel to at least a predetermined extent before the streamer rolls reach the target; and/or pre-known, given at least wind conditions, to be small enough to result in less than a further predetermined amount of unraveled streamers scattering distally in excess of the perimeter, and wherein the processor is configured to track the target drone using imagery generated by the onboard camera including at least once, when the wind conditions exist, guiding the interceptor drone to a firing position whose distance from the target drone is d, and commanding the cannon to fire at firing angle A, once the firing position is achieved, thereby to use the flexible elongate intercepting agent to down target drones.

Typically although not necessarily, a single processor is operative for controlling both the drone's motion and the cannon firing operations.

It is appreciated that the firing angle A may be determined in real time, or may be constant.

The firing distance may be pre-known given wind conditions or may be pre-known given wind conditions and other conditions such as, say, weather conditions other than wind or other relevant conditions.

According to some embodiments, the onboard processor may be operative determine firing distance d which is pre-known, given at least wind conditions, to be large enough to allow at least a first predetermined amount of flexible elongate intercepting agents streamer rolls fired by the cannon to each unravel to at least a predetermined extent before the streamer rolls reach the target.

According to some embodiments, the onboard processor may be operative determine firing distance d which is pre-known, given at least wind conditions, to be small enough to result in less than a further predetermined amount of unraveled streamers scattering distally in excess of the perimeter.

According to some embodiments, the onboard processor may be operative determine firing distance d which is pre-known, given at least wind conditions, to be large enough to allow at least a first predetermined amount of flexible elongate intercepting agents streamer rolls fired by the cannon to each unravel to at least a predetermined extent before the streamer rolls reach the target; and is also pre-known, given at least wind conditions, to be small enough to result in less than a further predetermined amount of unraveled streamers scattering distally in excess of the perimeter.

Embodiment 2. A system according to any of the embodiments herein wherein the onboard processor determines firing distance d by accessing a memory which stores at least one distance d predetermined, for at least given wind conditions and a predetermined firing angle, to be:

large enough to allow at least a first predetermined percentage of streamer rolls fired by the cannon to unravel to at least a second predetermined percentage of their total length before the streamer rolls reach the target; and/or small enough to result in less than a third predetermined percentage of unraveled streamers scattering distally in excess of the perimeter, and wherein the cannon fires at the predetermined firing angle.

Set-Up experiments may include the following: For each of several wind conditions, and for a given firing angle, fire from several possible distances such as, say, 6 to 20 meters, at 2 meter intervals, and identify, by trial and error, and/or by interpolation at least one firing distance for which a first predetermined percentage of streamer rolls fired by the cannon unravels to at least a second predetermined percentage of their total length before the streamer rolls reach the target and less than a third predetermined percentage of unraveled streamers scatters distally in excess of the perimeter Then store that firing distance for use in those wind conditions.

Embodiment 3. A system according to any of the embodiments herein wherein the firing angle is always at least zero degrees below the horizontal.

Embodiment 4. A system according to any of the embodiments herein wherein the firing angle is, for at least some missions, 15-25 degrees below the horizontal.

According to some embodiments, the firing angle of ~20 degrees below horizontal, although some real-life drone motion patterns, which depend on direction of approach, wind speed, target relative speed render another firing angle desirable. So, for example, 20 degrees below the horizontal may be the default, however the actual firing angle may be determined in real time and may deviate from the default according to actual scenario parameters.

Embodiment 5. A system according to any of the embodiments herein wherein the firing angle is constant.

for example, the cannon may be fixedly mounted on the interceptor drone and controlling the interceptor's speed of approach controls the leaning angle-hence the firing angle.

Embodiment 6. A system according to any of the embodiments herein wherein the interceptor agent comprises a streamer.

Embodiment 7. A system according to any of the embodiments herein wherein the first predetermined amount comprises a percentage p1 within a 70-90% range.

Embodiment 8. A system according to any of the embodiments herein wherein the predetermined extent comprises a percentage p2 within a 45-75% range, of a streamer roll's total length.

Embodiment 9. A system according to any of the embodiments herein wherein the further predetermined amount comprises a percentage p3 within a 5-30% range.

For example, according to certain embodiments, the first predetermined percentage p1 comprises 70-90% e.g. 85% (say 17/20 streamers) and/or the second (predetermined percentage p2 comprises 45-75% e.g. 60% (e.g. Streamers may unravel to a total of 6 m length (or approximately an order of magnitude greater than the size of the target) out of their total approx. 10 m length), and/or the third predetermined percentage p3 comprises 5-30% e.g. 15% (e.g. 3/20 streamers scattering distally in excess of the perimeter p). p3 may be a percentage of the total number of streamers fired or a percentage of the first percentage. Any of p1, p2, p3 may also be a predetermined numerical value which may be determined by trial and error or may be pre-computed or analytically determined to provide a predetermined probability of downing the target drone.

Embodiment 10. A system according to any of the embodiments herein and wherein the wind conditions comprises a wind velocity vector.

Embodiment 11. A system according to any of the embodiments herein and wherein the cannon is loaded with rolled flexible elongate intercepting agents such as streamer rolls.

Embodiment 12. A system according to any of the embodiments herein and wherein the rolled agents have a diameter and wherein the cannon's barrel has a diameter which exceeds the diameter of the rolled agents thereby to introduce distal or lateral scatter of the elongate agents about an axis defined by the cannon's barrel.

The cannon barrel diameter may exceed the rolled agents' diameter by any suitable extent e.g. by 10%, 20%, 30% or 40% or 50% or 75% or 100% or any other value in between, or by 1 cm, 2 cm, 3 cm, 4 cm, 10 cm or any other value in between, or any extent found operational by appropriate initial trials e.g.: internal barrel diameter double the roll diameter—say internal barrier diameter 4 cm, roll diameter 2 cm. Alternatively or in addition other factors e.g. Barrel configuration may introduce distal or lateral scatter. For example, a flared e.g. Cone-shaped barrel may be used.

Embodiment 13. A system according to any of the embodiments herein and wherein the processor is configured to track the target drone using imagery generated by the onboard camera including, when the wind conditions exist, guiding the interceptor drone to a firing position whose distance from the target drone is d, and commanding the cannon to fire at firing angle A, once the firing position is achieved and repeating the guiding and commanding if the target drone is not downed.

Embodiment 14. A method operative to down a target drone having propellers, the method comprising:

Providing a processor-controlled interceptor drone bearing at least one processor-controlled flexible elongate intercepting agent cannon and at least one onboard camera; and Using an onboard processor operative to receive sensed wind conditions and to determine a firing distance d, between the interceptor and target drones, given a firing angle A, wherein the firing distance d is:
  pre-known, given at least wind conditions, to be large enough to allow at least a first predetermined amount of flexible elongate intercepting agents streamer rolls fired by the cannon to each unravel to at least a predetermined extent before the streamer rolls reach the target; and/or
  pre-known, given at least wind conditions, to be small enough to result in less than a further predetermined amount of unraveled streamers scattering distally in excess of the perimeter,
and wherein the processor is configured to track the target drone using imagery generated by the onboard camera including at least once, when the wind conditions exist,
  guiding the interceptor drone to a firing position whose distance from the target drone is d, and
  commanding the cannon to fire at firing angle A, once the firing position is achieved,
  thereby to use a flexible elongate intercepting agent to down target drones.

Embodiment 15. A computer program product, comprising a non-transitory tangible computer readable medium having computer readable program code embodied therein, the computer readable program code adapted to be executed to implement a method operative to down a target drone having propellers, the method comprising the following operations:

Providing a processor-controlled interceptor drone bearing at least one processor-controlled flexible elongate intercepting agent cannon and at least one onboard camera; and Using an onboard processor operative to receive sensed wind conditions and to determine a firing distance d, between the interceptor and target drones, given a firing angle A, wherein the firing distance d is:
  pre-known, given at least wind conditions, to be large enough to allow at least a first predetermined amount of flexible elongate intercepting agents streamer rolls fired by the cannon to each unravel to at least a predetermined extent before the streamer rolls reach the target; and/or
  pre-known, given at least wind conditions, to be small enough to result in less than a further predetermined amount of unraveled streamers scattering distally in excess of the perimeter,
and wherein the processor is configured to track the target drone using imagery generated by the onboard camera including at least once, when the wind conditions exist,
  guiding the interceptor drone to a firing position whose distance from the target drone is d, and
  commanding the cannon to fire at firing angle A, once the firing position is achieved,
thereby to use a flexible elongate intercepting agent to down target drones.

Also provided, excluding signals, is a computer program comprising computer program code means for performing any of the methods shown and described herein when the program is run on at least one computer; and a computer program product, comprising a typically non-transitory computer-usable or -readable medium e.g. non-transitory computer-usable or -readable storage medium, typically tangible, having a computer readable program code embodied therein, the computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with some or all of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, BluRays, magnetic-optical discs or other discs; RAMs, ROMs, EPROMs, EEPROMs, magnetic or optical or other cards, for storing, and keyboard or mouse for accepting. Modules shown and described herein may include any one or combination or plurality of: a server, a data processor, a memory/computer storage, a communication interface, and a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. Use of nouns in singular form is not intended to be limiting; thus the term processor is intended to include a plurality of processing units which may be distributed or remote, and the term server is intended to include plural typically interconnected modules running on plural respective servers, and so forth.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless stated otherwise, terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining", "providing", "accessing", "setting" or the like, refer to the action and/or processes of at least one computer/s or computing system/s, or processor/s or similar electronic computing device/s or circuitry, that manipulate and/or transform data which may be represented as physical, such as electronic, quantities e.g. within the computing system's registers and/or memories, and/or may be provided on-the-fly, into other data which may be similarly represented as physical quantities within the computing system's memories, registers or other such information storage, transmission or display devices or may be provided to external factors e.g. via a suitable data network. The term "computer" should be broadly construed to cover any kind of electronic device with data processing capabilities, including, by way of non-limiting example, personal computers, servers, embedded cores, computing system, communication devices, processors (e.g. digital signal processor (DSP), microcontrollers, field programmable gate array (FPGA), application specific integrated circuit (ASIC), etc.) and other electronic computing devices. Any reference to a computer, controller or processor is intended to include one or more hardware devices e.g. chips, which may be co-located or remote from one another. Any controller or processor may for example comprise at least one CPU, DSP, FPGA or ASIC, suitably configured in accordance with the logic and functionalities described herein.

The present invention may be described, merely for clarity, in terms of terminology specific to, or references to, particular programming languages, operating systems, browsers, system versions, individual products, protocols and the like. It will be appreciated that this terminology or such reference/s is intended to convey general principles of operation clearly and briefly, by way of example, and is not intended to limit the scope of the invention solely to a particular programming language, operating system, browser, system version, or individual product or protocol. Nonetheless, the disclosure of the standard or other professional literature defining the programming language, operating system, browser, system version, or individual product or protocol in question, is incorporated by reference herein in its entirety.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein and/or to perform functionalities described herein and/or to implement any engine, interface or other system described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings:

FIG. 4a shows streamers' trajectory in strong wind.

FIG. 5 is an example flow, useful for example for finding a target at such and such an azimuth.

FIG. 6 is a table illustrating streamer characteristics, used in experimentation with two types of cannons.

FIGS. 7a-7b are tables specifying example suitable firing positions for type 80 and type 40 cannons respectively, defined relative to a target drone.

Figure 1A:
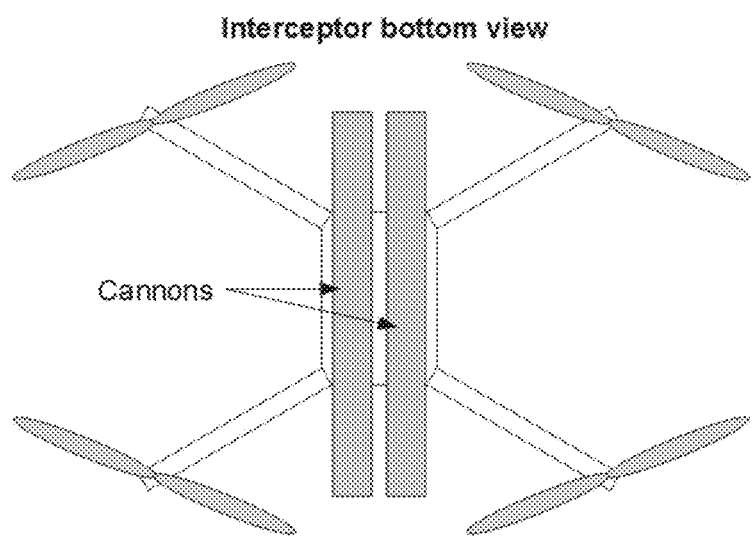
FIGS. 1a-1b show top and bottom views of an example interceptor system.

Methods and systems included in the scope of the present invention may include some (e.g. any suitable subset) or all of the functional blocks shown in the specifically illustrated implementations by way of example, in any suitable order e.g. as shown.

Computational, functional or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Each functionality or method herein may be implemented in software, firmware, hardware or any combination thereof. Functionality or operations stipulated as being software-implemented may alternatively be wholly or fully implemented by an equivalent hardware or firmware module and vice-versa. Firmware implementing functionality described herein, if provided, may be held in any suitable memory device and a suitable processing unit (aka processor) may be configured for executing firmware code. Alternatively, certain embodiments described herein may be implemented partly or exclusively in hardware in which case some or all of the variables, parameters, and computations described herein may be in hardware.

Any module or functionality described herein may comprise a suitably configured hardware component or circuitry. Alternatively or in addition, modules or functionality described herein may be performed by a general purpose computer or more generally by a suitable microprocessor, configured in accordance with: methods shown and described herein, or any suitable subset, in any suitable order, of the operations included in such methods, or in accordance with methods known in the art.

Any logical functionality described herein may be implemented as a real time application, if and as appropriate, and which may employ any suitable architectural option such as but not limited to FPGA, ASIC or DSP or any suitable combination thereof.

Any hardware component mentioned herein may in fact include either one or more hardware devices e.g. chips, which may be co-located or remote from one another.

Any method described herein is intended to include within the scope of the embodiments of the present invention also any software or computer program performing some or all of the method's operations, including a mobile application, platform or operating system e.g. as stored in a medium, as well as combining the computer program with a hardware device to perform some or all of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

Figure 1B:
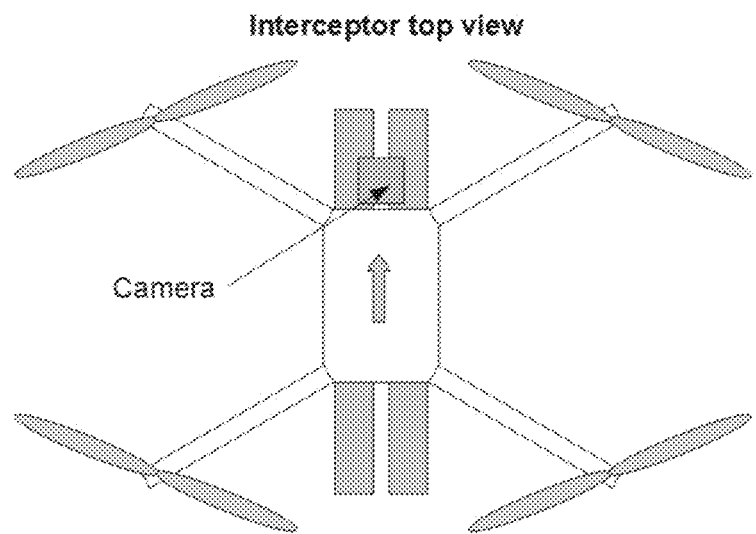
Figure 2A:
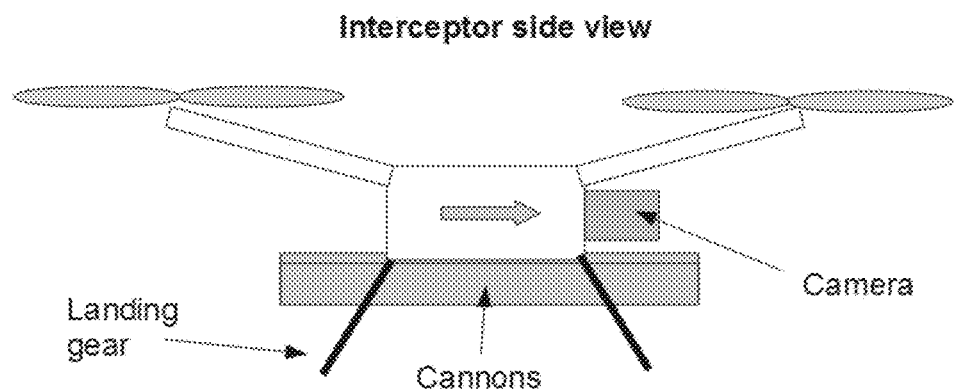
FIG. 2a shows a side view and FIG. 2b shows an example firing setup.
Figure 2B:
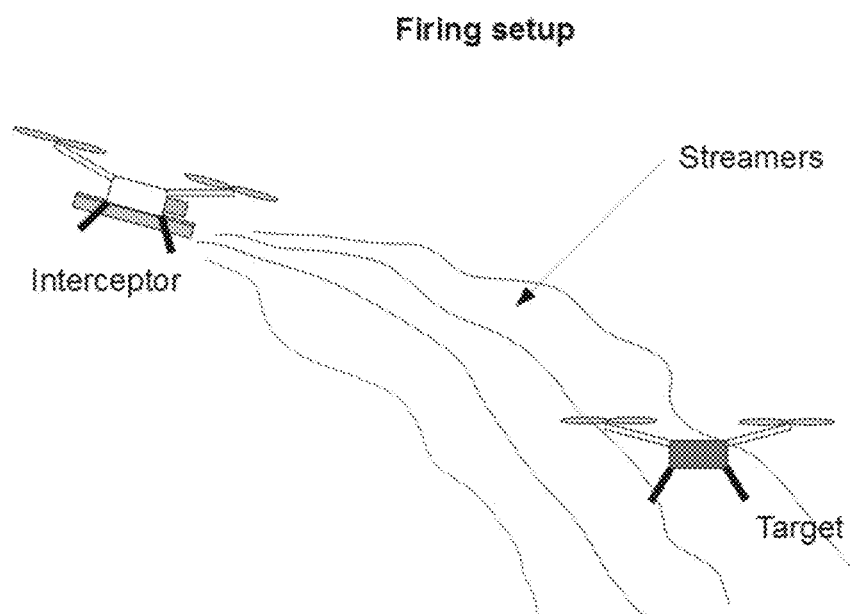

FIGS. 1a-1b show top and bottom view of an example interceptor system. FIG. 2a shows a side view and FIG. 2b shows an example firing setup.

More generally, the Drone Interceptor system may comprise an autonomous drone interception system and may incorporate some or all of: a radar system which provides target detection and assignment, a ground control system, and one (or several) interceptor drones. Typically, the interceptors are directed to the target (a hostile drone or UAV) by the radar system, autonomously track the target e.g. using visual sensors at close range, and finally intercept the target using inter alia the methods and/or logic and/or hardware shown and described herein.

Examples of target drones are DJI Phantom 2/3/4, DJI Mavic, DJI spark, and SYMA X5. Target drones that can carry weight and have a reasonable flight time, may fly at speeds of, say, 5 or 10 or 20 or 30 or more m/s, or values in between, and may be about 1-5 kg in weight; the interceptor drone is typically faster e.g. at least 30% faster than the target and typically includes onboard cannon/s and computer. If, for example, the interceptor drone is specified to have twice as much power as required for its size, it will have high acceleration and speed and a suitably long flight time. It is appreciated that if the target is approaching the protected asset, the interceptor drone, even if slower, can still intercept, whereas in order to dog-chase the target, the interceptor needs to be faster than the drone.

The drone interceptor system typically includes all or any subset of the following components:

a. Ground control station. The ground system (e.g. a computer (PC or tablet) running code for controlling the Drone's actions) typically connects to radar/COMMINT/visual or any other detection system. The ground system may receive the position of the target drone from the detection system, and relay this information to the interceptor, which then plans the interception. The ground system may also include an automatic docking port for rearming and recharging.

b. Single or multiple interceptor drones c. Drone-detection radar system d. Communication system for ground-interceptor connection One possible sequence of system operation includes all or any subset of the following processes, suitably ordered e.g. as follows:

A perimeter is defined round the protected asset

The radar system detects intruders entering the protected perimeter

Optical sensors are directed at the intrusion point for positive visual affirmation Once affirmed, the radar system tracks the target (intruder) and continuously sends target position reports to the drone interceptor ground station The ground station assigns target(s) to interceptor drones, and continuously sends target position to the interceptors The interceptor takes off from its docking station The interceptor flies at maximum speed to the given target position Once at acquisition range, the interceptor searches for the target using onboard camera(s)

Once visually detected, the interceptor visually tracks the target as it approaches it The interceptor assumes position for interception The interceptor fires the "hard" measures at the target to neutralize it, typically by entangling elongate agents in the propellers arranged about an imaginary target perimeter The interceptor uses visual tracking to assess the target status ("kill assessment")

The interceptor reports status to the ground station

The interceptor returns to base for charging/maintenance

Typically, the ground station controls the drone interceptor system, and is responsible for some or all of target queueing, interceptors management, interface with the drone-detection systems and ground-to-air communication. The ground stations software may, for example, have all or any subset of the following interfaces:

Interface to drone detection systems (radar, COMMINT, visual or any combination of them)

Radio link to the interceptors' docking station

Radio link to the interceptor drones

The ground station typically provides a graphical user interface (GUI), e.g. providing all or any subset of the following:

Map display of the region of interest

Indication of target drone's position, e.g. as received from the detection system Indication of the interceptors' position, e.g. as reported by the interceptor drone(s)

Means to command the interceptor to engage/abort

Display of the interceptors' status (e.g. some or all of attitude, position, battery level, remaining ammo etc.

Typically, a docking station is provided to house and protect the interceptor drone while it is on the ground. The station may include some or all of a landing platform, protective retractable/removable cover, and electronic hardware. The station may provide all or any subset of the following features:

mechanical shelter for the interceptors, providing weather protection automatic battery charging of the interceptor drone retractable cover which can be opened by a remote command elevated takeoff/landing platform, providing sufficient headroom for safe landing and takeoff. The landing platform may be equipped with special visual signs or lights to allow precision landing of the interceptors.

radio communication with the ground station computer for status reports and control.

The interceptor drone typically comprises a multirotor vehicle (e.g. QUAD/HEX/OCTA/6Y or any other configuration), installed with some or all of the following components:

Radio set for communicating with the ground station

Ribbon-streamers cannon (one or more)

Cannon firing control circuitry

Fixed/stabilized camera(s)

A processor board ("companion computer")

The ribbon streamers or other elongate flexible agent may for example comprise conventional confetti streamers and may be used as "soft ammunition" to neutralize and disable target drones. Nylon or mylar streamers (which have metallic color e.g. gold or silver due to a metal deposition process) may be used by way of example, although other materials e.g. cloth, and Kevlar streamers also may be used for certain embodiments. Paper streamers may fail e.g. if they unwrap as soon as they leave the barrel or if they tear rather than entangling the target propellers. Suitable set-up experiments may optionally be used to identify possible relevant difference in performance (e.g. strength to prevent tearing, spreading).

When the streamers are initially packed as rolls, they fly straight, but as they unfold or unravel they create drag, which typically causes them to "halt" in mid-air.

The streamer cannons may for example comprise off-the-shelf confetti cannons used as special effects and decoration which may be low-cost, disposable, one-time devices.

Different cannons may have different gas volumes, which affect the capacity of the cannon (how many streamer rolls the cannon can fire e.g.), and also the velocity of the rolls (conservation of momentum). The weights of the gas cylinders may for example be 400 gr for the 80 cm cannon, and 250 gr for the 40 cm cannon yielding almost double the power of the 80 cm cannon. It is appreciated that when the cannon is horizontal or close to horizontal, all energy yields horizontal velocity, causing the streamers to travel generally straight with less scatter than if the cannon were deployed vertically or almost vertically, thereby to achieve larger firing distance by orienting the cannon close to the horizontal e.g. as described herein.

An alternative to the single-use compressed gas cylinder would be a compressed-air reusable cylinder. Pyrotechnic devices may also be employed. Typically each cannon houses plural e.g. 20 streamer rolls each comprising a single, say, 10 m-long ribbon 1 or 2 cm wide, rolled into a roll whose diameter is, say 2 cm. These rolls may be tossed loosely into the cannon's barrel. Typically the cannon fires all its rolls simultaneously. Any suitable barrel length may be employed, typically pre-tested to determine how its length, in combination with other factors, affects scattering. For example, when using 80 cm long cannons of which 20 cm is the cylinder and 60 cm is the tube or barrel, scatter may be narrower than the scatter obtained if the barrel is cut from 60 cm to about 30 cm.

The ribbons may be packed, typically loosely, as individual rolls inside a canister of larger diameter. Any suitable dimensions and properties of the ribbons may be employed, typically after pre-testing to establish effectiveness of the resulting neutralizing system. For example, testing may be done at a variety of firing angles and ranges (firing distances). For example, the ribbon properties may be any or all of:

Ribbon width of 10-20 mm

Individual ribbon length: 10 m or an order of magnitude more or less

Number of ribbons in a single canister: 20-25 metallic color coated, e.g. to increase ribbon mass and/or strength

The canister may for example comprise a cardboard tube, having a pressurized gas cylinder or alternative at its bottom, used to fire the ribbons. The gas cylinder may be filled with pressurized gas (usually $CO_2$), which may be released in any suitable manner, say, by mechanically counter-rotating the cannon body and the cylinder, or by applying current to a filament which, in turn, melts and releases the cylinder's seal. The compressed gas is released, propelling the packed ribbon rolls, and ejects them from the canister. Once released, the ribbons unroll or unravel, as they fly through the air. Electrical initiation may be controlled by a companion computer. The interceptor drone may carry one or more cannons, depending on their size and weight, and the drone carrying capacity.

The cannons may be attached to the interceptor drone's bottom e.g. by fasteners which enable quick assembly and disassembly for reloading. For example, the fastener system may include:

Front and/or back cannon holders e.g. one or two or more typically identical pieces shaped as the figure "8", connecting two cannons into a single assembly. Each piece may have a fastener lever used to clamp the cannon to the device; and/or a quick-release apparatus, fixedly connected to the drone's bottom which enables rapid connecting of the 2-cannon (say) assembly with the front and back fasteners to the drone's body, thereby to allow the drone to be loaded and reloaded automatically by the docking station. The actual clamp device may differ, depending on the vehicle type (shape, length, available fastening options).

Typically, firing control circuitry controls the firing sequence of the cannons. The circuitry may be connected to the drone's battery as a power source, and to the main processor for fire commands. The circuit typically includes a CPU which receives a single firing command from the main processors, and applies current to the first cannon to initiate it. The CPU typically then waits for another firing trigger to initiate the second cannon if any, and so forth. The control circuit typically outputs an indication signal to a main processor to indicate its state e.g.

Waiting for firing command
One cannon fired
Two cannons fired (empty)
Electrical problem The main processor may use the above status indication for reporting to the ground station.

A suitable optical subsystem may be provided. For example, typically the interceptor drone uses camera(s) to detect and track the target drone at close range. The cameras may provide real-time video images to the main processor. The camera is typically installed in the front of the drone, yielding a maximal viewing angle without obstruction by the drone arms. The camera may have a day (visual) or night (IR) sensor, and may be characterized by some or all of the following properties:

Horizontal field of view of at least 60 degrees
Vertical field of view of at least 50 degrees
Resolution greater than 1MP
Frame rate of 30FPS or more
Digital interface to the main processor (USB/MIPI/Camera Link or other)

Using a gimballed camera provides a fixed field of view and reduces computational load off the main processor. Using a fixed camera requires more processing resources, but less moving mechanical parts, and is easily calibrated. The system may use either gimballed or fixed cameras, depending e.g. on the available space and power for a gimbal device, available processing power and required field-of-view.

Typically, a suitable main processor is provided. For example, the interceptor drone may be fitted with an onboard mini computer which may manage the drone autonomously and/or may control the interception sequence. The processor typically performs some or all of the following functions:

Communicates with the ground station over radio link
Controls the drone movement, either by electrical commands (for fast maneuvers) or using a communication protocol for slower or higher level commands, such as "go to position".
Performs image processing on frames captured by the front camera, to detect and track the target drone
Communicates tracking status to the ground station
Sends video stream to the ground station
Estimates relative position and/or range of the target drone, and computing optimal firing position
Issues firing trigger to the fire control circuit
Use visual processing to estimate interception result
Guides the drone to precision land on the docking platform, using visual and/or other means.

Any suitable interception sequence may be provided, to define the messages sent between the ground station and the interceptor, and processing in the interceptor.

Any suitable target assignment protocol may be employed. Typically, the ground station is assigned a target by the radar system. The target position is typically given in geographical coordinates (LAT/LON) and altitude, along with its speed and heading. Given the target's speed and position, the ground station typically assesses the interception probability I_P, taking into consideration the interceptor maximum speed, time to intercept, and range at interception point. Typically, if the target is "eligible" for interception e.g. I_P is over a threshold, the interceptor is launched.

Before take-off, typically, the interceptor is docked in the charging station. Once a valid target is assigned for interception, the interceptor is commanded to take off e.g. according to the following sequence, some or all of whose operations may be provided:

Perform pre-arm checks:
    Communication check
    Battery condition check
    GPS fix check
Take off:
    Ground station (GS) sends take-off command
    Interceptor acknowledges command and takes off to 15 m The ground station typically sends some or all of: target position, altitude, heading and speed to the interceptor, continuously. The interceptor typically computes range-azimuth from current GPS position to the given target position. As long as the target range is greater than Racquire, the interceptor moves at max speed toward the target position, while continuously computing range-azimuth to the last target position, e.g.:

Do:
    Compute range-bearing to target
    Set GLOBAL NED velocity to target direction
While tgt.range>Racquire.

Any suitable method may be used for visual search of a target. For example, when the interceptor is within Racquire from the target, the interceptor may begin to process images from the camera and may initiate a tracking window around the target's anticipated position, e.g. finding a target at such and such an azimuth, say by performing some or all of the operations shown in FIG. 5.

Typically, once a target is detected inside the region of interest (tracking window), the target is tracked. For example, the target's Euclidean distance from the anticipated position may be computed. If several objects are detected, one e.g. the one which is closest to the anticipated position may be selected for tracking. The main processor typically performs frame-to-frame correlation to establish a firm tracking window around the target. The processor may then start a control loop (PID control) to lock onto the target, and may set the interceptor drone's velocity vector toward the target.

Any suitable target size and range estimation may be employed. Typically, in order to assume optimal firing position, the interceptor continuously evaluates the targets range using any suitable method, for example:

using machine-learning algorithms to classify the target type and size, then use geometric computation to estimate the targets range based on its relative size in the frame, and/or:

using stereo-vision (dual camera setup) to compute disparity maps and evaluate range, and/or:

using an ultrasonic sensor to measure range (as the drone is in the air and faces the target, there is low probability of false measurement), and/or:

using a laser-based range finder or LIDAR (Laser Radar) sensor.

Typically, the end-game or final stage of interception sequence includes approaching the target to within firing range, and initiating one or more cannons to shoot down the target typically using real-time control, due to impact of external factors. Wind direction, for example, may be deemed an external factor requiring real-time control, since wind may affect the spreading of the nylon ribbons in the air. In wind-free conditions, the firing range may be fixed and empirically pre-defined based on tests. In moderate wind conditions, the final interception may then be planned by the main processor in real-time, and may take into account the wind direction and/or the interceptor-target relative position.

Ribbons may be fired with the wind direction due to some or all of the following considerations:
  The ribbons move away from the interceptor, reducing the chance of self-impact.
  As the ribbons unroll and spread vertically, the wind speed causes them to move laterally, increasing the probability of them getting tangled in the target propellers.
  Allows firing from a longer distance, reducing complexity of close-range maneuvers.

The processor management software typically includes a suitable algorithm to continuously evaluate wind speed and direction, e.g. based on the interceptor drone actual movement. The algorithm typically uses the drones' attitude (lean angles) to compute the amount of moment exerted by the motors to resist the wind forces. The output, wind direction and/or speed, may be used by the processor to compute optimal firing range and relative position.

Wind estimation functionality is available in various flight-control firmwares, e.g, the "ArduCopter" open-source flight controller It is appreciated that drones typically can lean forward-backward and left-right up to a certain angle. A drone, when horizontal, can only ascend or descend (no sideways forces). The drone typically leans forward when about to move forward, and sideways when about to move sideways. So, to achieve a suitable firing angle, the drone may be commanded to move faster, which causes more lean downwards.

A kill assessment may be made e.g. by estimating vertical velocity of target from camera image and own-velocity.
If $v_z$>dead_fall_vel then report kill.

Any suitable algorithms may be used in the interception process such as but not limited to coordinate transformations e.g.:
  a. Local coordinates to pixel: the target position reported by the guidance radar is in global NED coordinates. For the interceptor to acquire the target, its position should be translated into local BODY coordinates, compensating for the vehicle's attitude (roll/pitch/yaw) and then to pixel coordinates; and/or
  Pixel to Local NED: the optical tracker outputs the target position in the image frame, i.e. pixel coordinates. These are translated to local NED coordinates, by compensating vehicle's attitude, and are used for motion control of the vehicle.

Example logic for shooting is now described, for a drone interceptor system such as that shown and described above, which is operative to (detect and) immobilize hostile drones using, typically, a ground-based detection and control system, in conjunction with interceptor drone/s. Typically, upon detection of an intruding drone, the ground control station dispatches the interceptor(s) toward the intruder.

Typically, once launched, the interceptor drone heads toward the target and also seeks the target e.g. using its onboard camera. Once visually detected, the interceptor typically fires ribbons at the target, which are, when the system is successful, caught in one or more of the target's propellers, practically immobilizing the target. The system may for example be designed to immobilize, or down, or "kill" medium amateur and consumer drones whose total weight is in the order of 1-6 kg, and size (shaft to shaft, diagonal) in the order of 30-70 cm, or, alternatively, may be optimized (e.g. maximum performance at minimum cost per interception) for smaller or larger drones. A system optimized for a sub-class of drones may be used also for drones not falling within the sub-class.

Typically although not necessarily, the interceptor drone uses nylon ribbons as its immobilizing agent. The ribbons may be packed as rolls inside a tube, and may be ejected using compressed gas e.g. using one or more off-the-shelf confetti streamer cannons used for special effects; these may be controlled electronically by the interceptor drone.

Examples of cannon types, used in experimentation, include: Type 40: a 40 cm long cannon, with a 150 gr compressed gas cylinder; and/or Type 80: a 80 cm long cannon, with a 250 gr compressed gas cylinder. Example streamer characteristics, used in experimentation with the above 2 types of cannons, are shown in the table of FIG. 6.

When e.g. as soon as the interceptor reaches its firing position e.g. as defined herein, relative to the target, the interceptor typically triggers the streamer cannons. Any of the teachings shown and described herein may be used for setting the firing position. When fired, using either electrical trigger signal or manual rotation, the gas cylinder is typically discharged, ejecting the streamer rolls, which unwrap or unravel as they fly in the air, creating a "rain" or shower or cloud of ribbons.

Typically, the central tendency of the streamer shower is initially, e.g. until the forward velocity lessens and the streamers' path is more affected by air resistance. Generally, cone-shaped streamers are randomly distributed within the volume of the cone. The circle area perpendicular to the direction of streamer advance is populated by streamer-heads, and gradually expands as the distance from the firing point increases, such that the number of streamers falling at various distances d from the cone's axis, varies. At any given moment m counting from firing time, assuming uniform conditions prevail, including wind, there is, within a given plane perpendicular to the cone's axis, a different distance d at which the streamer heads are concentrated, relative to other distances at which less streamer heads are concentrated. At that given moment m. simply speaking, a firing position is selected, which, at the plane which coincides with the main plane of the target drone, causes a distance d which is reasonably populated with streamers, e.g. the distance d which is most densely populated with streamers, to coincide with the largest area of the target, i.e., the circle circumscribing the propellers of the target, at the moment of impact between the streamers and the target. If the firing position is selected too close to the target drone, the area of the cone base at the moment where the cone base (that is, the area populated by the majority of streamer-heads) coincides with the largest dimension of the target) is too small, and the streamers are still unraveled, the chances of hit are reduced. Selecting a firing position too far from the target drone, the scattering of the streamers (i.e., the area of the cone base, where most streamer heads are concentrated) may be too wide as to hit the target e.g. because, statistically, to the extent the firing position is far, the cone base becomes large and the number of streamers per unit area of the cone base is small, hence the hit-rate for the target, which is itself typically small relative to the cone base, is also small.

It is appreciated that wind parameters typically factor into selecting of the firing position. For example, if there is no wind, all streamers may fan out 7-8 meters from the interceptor and may be too widely distributed 12 meters from the interceptor. In contrast, in windy conditions, the same streamers may fan out only 16-20 meters from the interceptor.

If the target drone is stationary or slow moving, it may be desired to fire the streamers at a distance d, which will cause the streamers to reach the target position near their free-fall phase. In such cases, the vertical direction of the streamers is perpendicular to the area of the target's propellers' rotation, enhancing the entanglement chances. This is true for stationary targets and slow-moving targets, where the firing phase is not time-limited, and there is sufficient time for the streamers to be fired, travel in the air while unravelling, start their descent, and only then impact the target. Since the special case of a stationary target is unlikely in a true operational scenario, moreover, it is handled satisfactorily by the "normal" firing procedure defined above, it is not implemented in this concept.

If the firing position is selected too far from the target drone, any distance d which is reasonably populated with streamers, may be larger than p or the streamers may enter their free-fall phase.

If the firing position is selected too close to the target drone, any distance d which is reasonably populated with streamers, may be smaller than p or the streamer roll may not have time to unravel.

Typically, the temporal sequence is that streamers first fly in the firing direction, fanning out into a cone, then gradually enter into free-fall. According to certain embodiments, the system fires at a distance from which the streamers have sufficient distance to unravel and to start to descend; the more perpendicular the ribbons are to the plane of the target's propellers, the more likely the ribbons will entangle the propellers, all other things being equal. According to certain embodiments, the firing position is selected to allow the streamer cone to intersect the target when the streamers are approximately 30-45 degrees from a horizontal state, or about half way through the above temporal sequence. If the drone is comparable to the scatter radius of the streamers, the firing parameters may be selected to target the propellers e.g. such that the cone's axis points at the target's centers and most streamers fall at the distance from the axis, which equals the distance between the propellers and the target center, and/or n cannons may be provided which are oriented to hit n of the propellers, e.g. when shot simultaneously. Typically, however, the target vehicle e.g. drone is much smaller than the scatter radius of the streamers, such that aiming as above toward the target propellers is not practical.

Typically, streamer rolls are not neatly and tightly slipped into a cannon of the same diameter. Instead, streamer rolls which are, say 2 cm in diameter, are loosely placed in a cannon whose diameter is larger, say 5 cm. If the rolls are "neatly slipped" into the cannon e.g. because the rolls' and cannon's diameter are almost the same, the streamer rolls would eject straight out of the cannon and have minimal scattering. A tighter barrel is useful e.g. if it is desired to fire from a greater distance, and if careful aiming is possible, since an advantage of streamer scatter is that accurate aiming becomes less necessary.

Typically, the firing position to be achieved is that which increases the probability of immobilizing the target drone. The interception trajectory is typically planned as to achieve this firing position, relative to the target drone. The tables of FIGS. 7a-7b specify example suitable firing positions for type 80 and type 40 cannons respectively, defined relative to a target drone. It is appreciated that many target drones are difficult to control for wind speeds over 40 km/h hence are a low-probability threat to a facility to be protected by the system herein. However, the system may be operated even in winds stronger than 40 km/h.

Figure 3A:
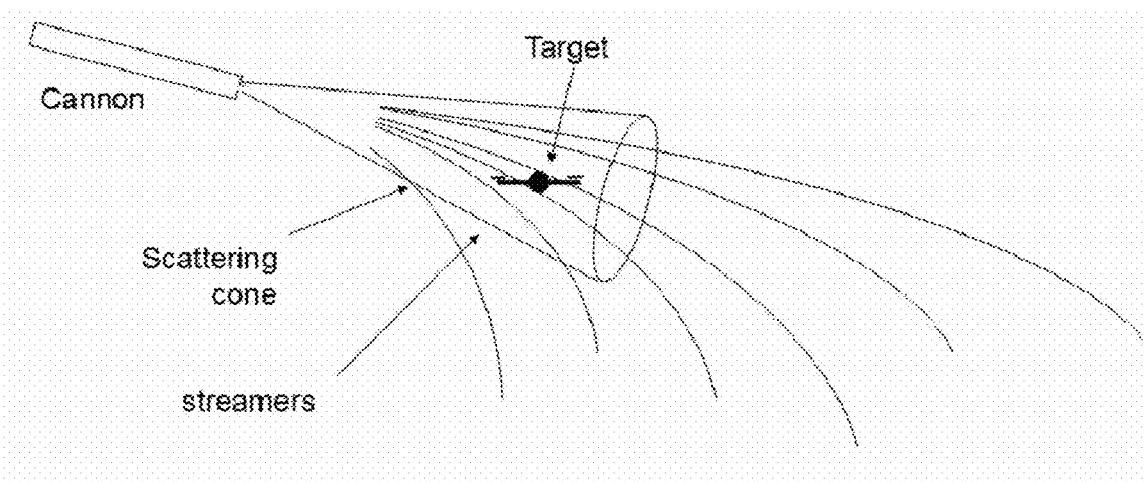
FIG. 3a illustrates a suitable firing geometry according to an embodiment.

FIG. 3a aka slide 1 illustrates a suitable firing geometry according to an embodiment. As shown, the target is at the center of the scattering cone. Streamers are mostly unraveled, having both vertical and horizontal velocity.

The cone is the theoretical volume which most or all of the streamers would occupy, assuming a gravitational force of zero. Typically, the streamers leave the barrel in several directions, bound by an imaginary cone having a head angle of, say, 20 degrees (where the parameter depends on cannon length, width and streamer roll diameter (the cone defines the streamers' spread as they leave the barrel, but is not infinite, practically speaking, because the streamers' trajectory changes at an early stage from motion generally along the horizontal, to free-fall with significant air resistance). In this slide, none of the streamers are shown hitting the propellers, however this is merely by way of example. Also, the drawing shows only a few streamers; conventional cannons shoot about 20 streamer rolls which mature into 20 streamers. Some streamers are shown shorter than others, because they have not yet unraveled to the same extent as their longer-seeming counterparts.

It is appreciated that an alternative to the horizontal or below horizontal firing method shown, is to fire directly downward i.e. normal to the ground, from directly above the drone. However, this requires much more accuracy in position. The streamers then have both downward velocity from the firing and gravitation, so they will spread to the diameter of the cone (whatever would that be at a given distance), then continue falling down. This means that the streamers only "rain" onto the target within the cone's volume, and nowhere outside that volume. Hence, if the interceptor drone fires too close to the target (not high enough above the target), the streamers would rain onto the target (the spread, due to the short firing distance, would not exceed the target diameter), however, the streamers would not fully unravel and short streamers are unlikely to entangle the propellers enough to down (or bring down) the target. Conversely, if the interceptor fires from too high above, then, statistically speaking, the streamers, most of which are close to the cone's outer surface, would for the most part be too distant from the cone's axis to impinge upon the target, hence the probability of streamers impinging upon the target would be too small. By firing close to horizontal, in contrast, almost 10 meters-worth of streamer in the air is achieved, all in the target's vicinity, hence with potential, e.g. to the streamers' flapping behavior, due to air resistance and/or wind and/or other forces operating on the streamers' tiny masses, to entangle one or another of the target's propellers, and hence down the target.

Figure 3B:
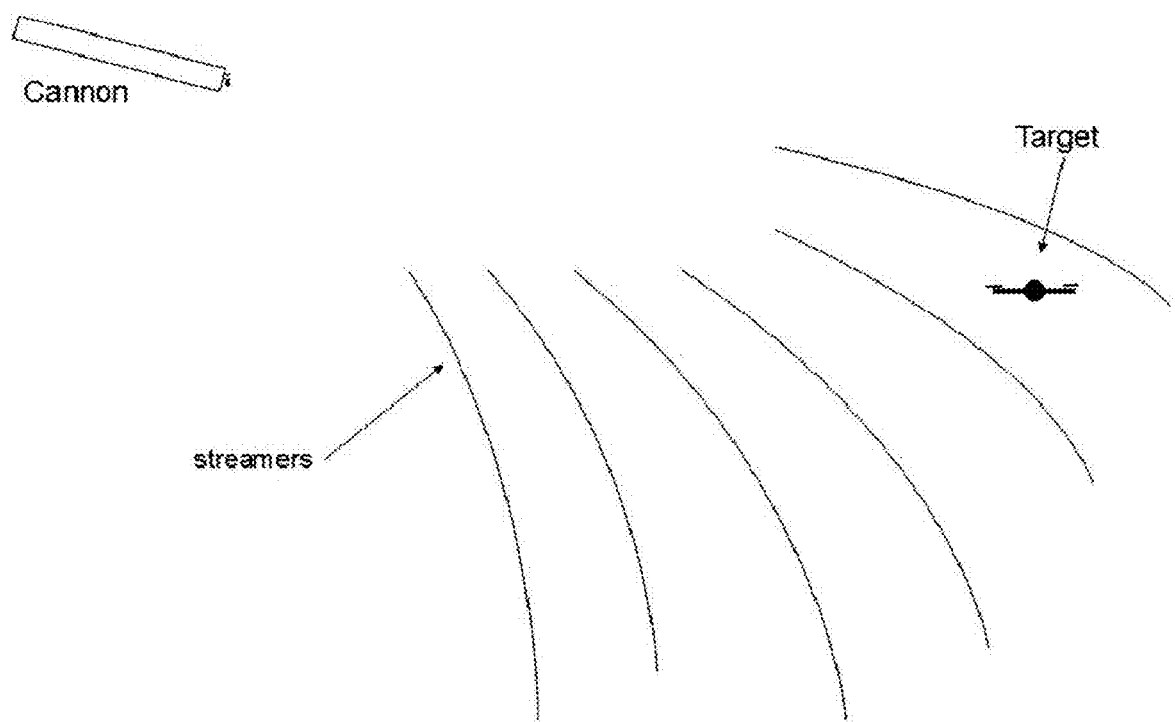
FIG. 3b shows a relatively unsuccessful firing geometry in which the target is out of the streamers' path.

FIG. 3b shows a relatively unsuccessful firing geometry in which the target is out of the streamers' path. The streamers are fully unraveled, having significant vertical velocity ("free fall"). There is a low density of streamers around the target perimeter, and low chances of streamers hitting the target.

As is apparent e.g. from FIG. 3b aka slide 2, when the firing distance is too great, the roll unravels fully before it reaches the target. But once it unravels fully, the roll's horizontal velocity approaches zero hence its path becomes similar to free fall, causing the streamer to fall below the target's altitude before it actually reaches the target, thus missing the target. It is appreciated that streamers which have not yet unraveled can be less than optimal e.g. because the streamers' states translates into, say 1-2 more seconds until the streamers are at the target's vicinity, which is enough time for a target to evade the streamers. Also, once the streamers are free-falling, they have no kinetic energy from the firing, and their trajectories are less predictable due to air resistance and wind.

Figure 3C:
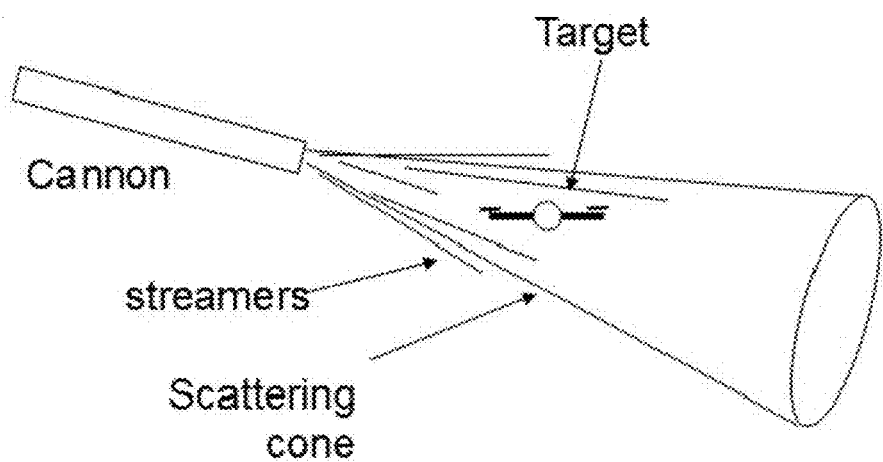
FIG. 3c shows a too-close firing geometry.

In FIG. 3c aka Slide 3, a "too-close" firing geometry is shown. The target is within the streamers path, but streamer rolls are still raveled, and are moving at very high horizontal velocity hence the probability of streamers hitting the target is low since at impact, the streamers are too short and/or are moving past the target too fast.

As shown, streamers which have hardly unraveled, are too short hence unlikely to entangle the propellers enough to down the drone. Also, streamers travelling fast (e.g. streamers not yet unraveled) have low chances of downing the target because they pass by the target very quickly, leaving but a tiny time window in which the streamers may entangle a propeller.

Figure 3D:
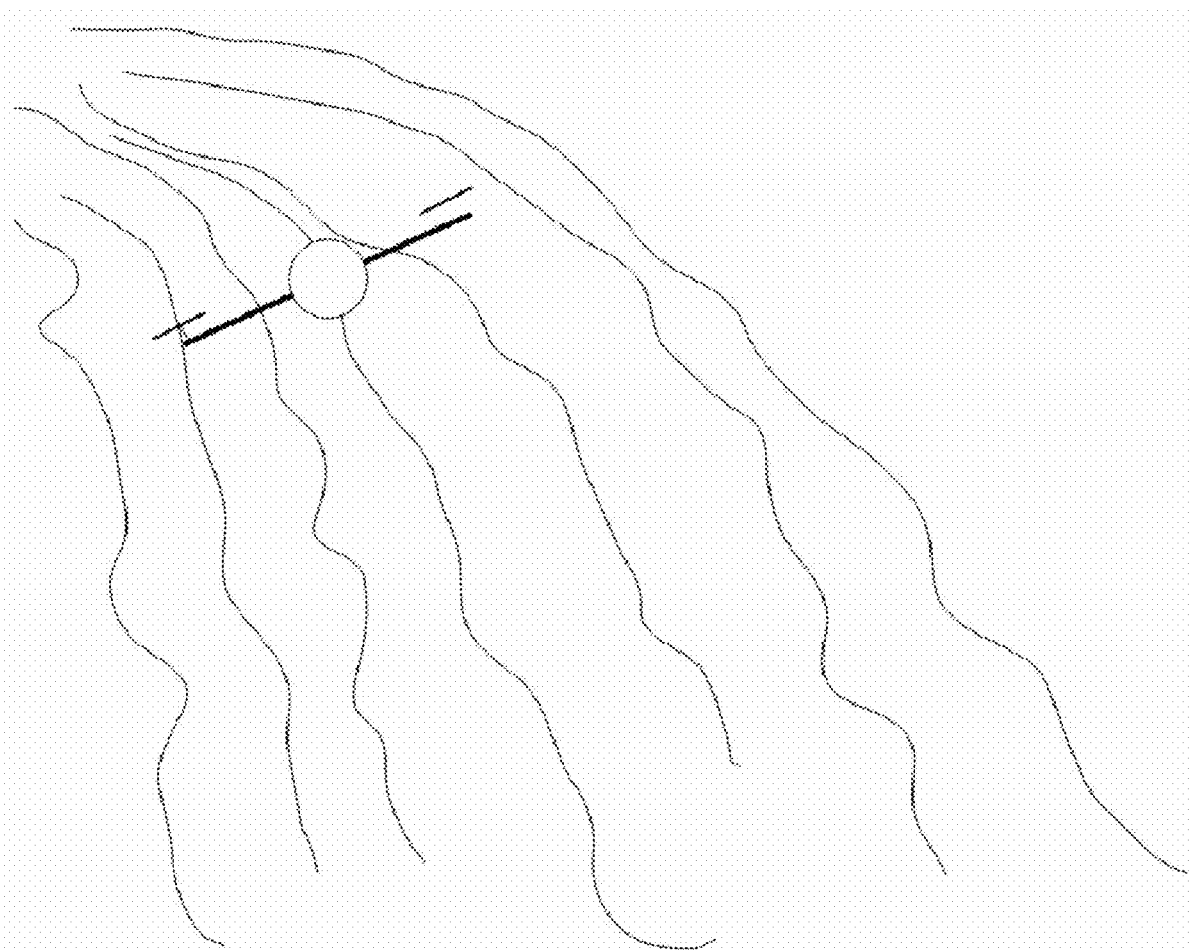
FIG. 3d shows an impact point where multiple streamers are impacting the target.

FIG. 3d aka Slide 4 shows an impact point where multiple streamers are impacting the target. One of the streamers is shown hitting a propeller. Two more propellers are not shown since one is obscured by the body, and another, closer to the viewer, is not drawn for clarity and simplicity.

FIG. 4a aka Slide 5 shows streamers' trajectory in strong wind. As shown, streamers gain vertical speed i.e. the vertical component of their velocity vector grows relative to the horizontal e.g. because the horizontal component is shrinking whereas their vertical component is increasing due to gravity 0.3 "stages" within a streamer's trajectory are indicated in the drawing as a, b and c respectively. In stage a, Streamers move straight as they leave the cannon. Being mostly horizontal and not yet fully unraveled, they experience only little wind force. In stage b, Air drag slows-down the streamers, causing them to gain vertical speed ("free-fall"). In stage c, The wind carries the streamers sideways as they continue to fall.

Horizontal arrows are also used in the drawing to show wind direction, as shown. A wide arrow shows the firing direction which is similar to the wind direction in slide 5 aka FIG. 4a.

Figure 4B:
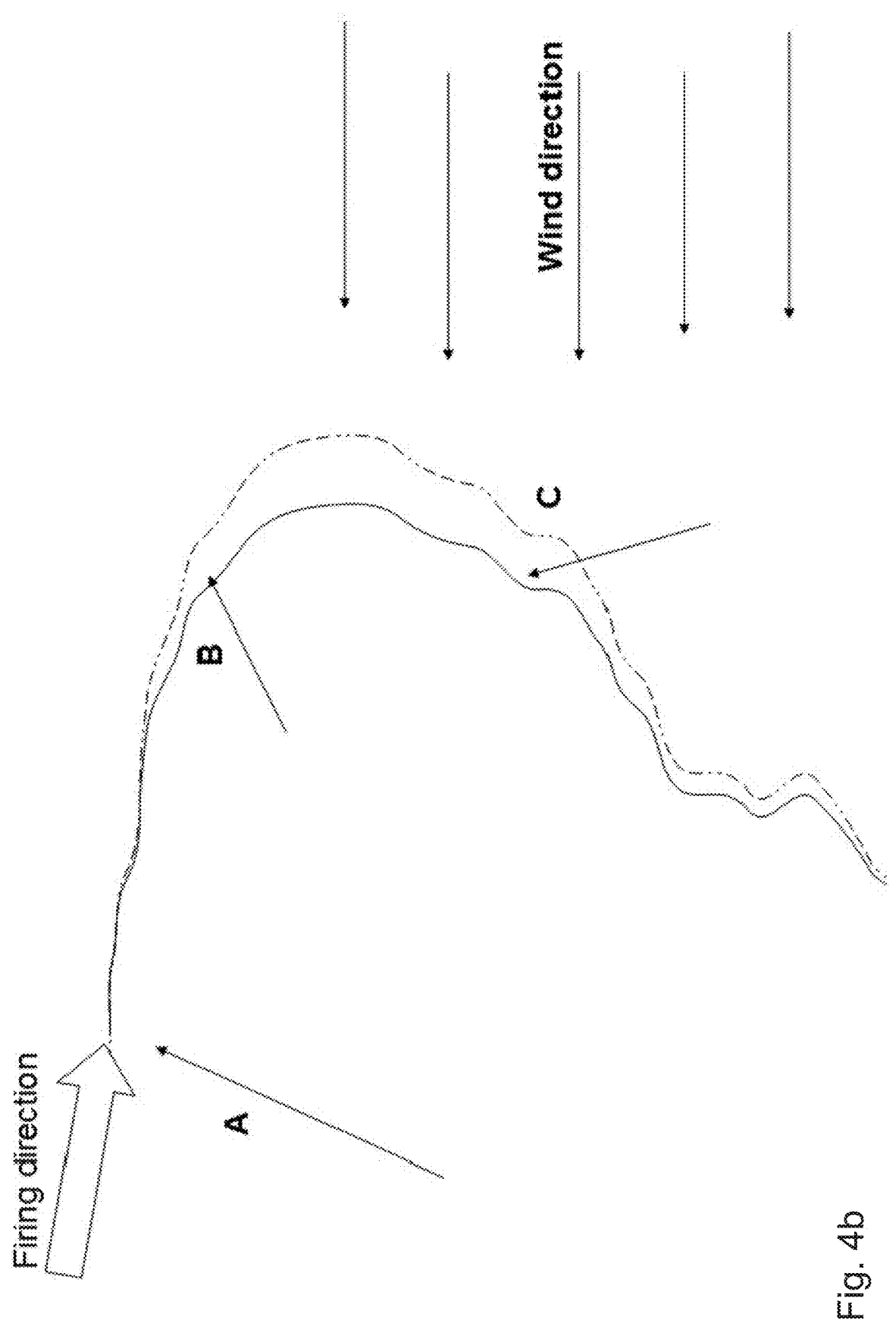
FIG. 4b shows streamers' trajectory in strong wind, when firing into the wind.

The firing direction is opposite to the wind direction in slide 6 aka FIG. 4b which shows streamers' trajectory in strong winds where the interceptor is controlled, for firing "into the wind". As shown, the wind direction is right to left which carries the streamers to the left in stage c, when compared to stage c in FIG. 4a.

Figure 4C:
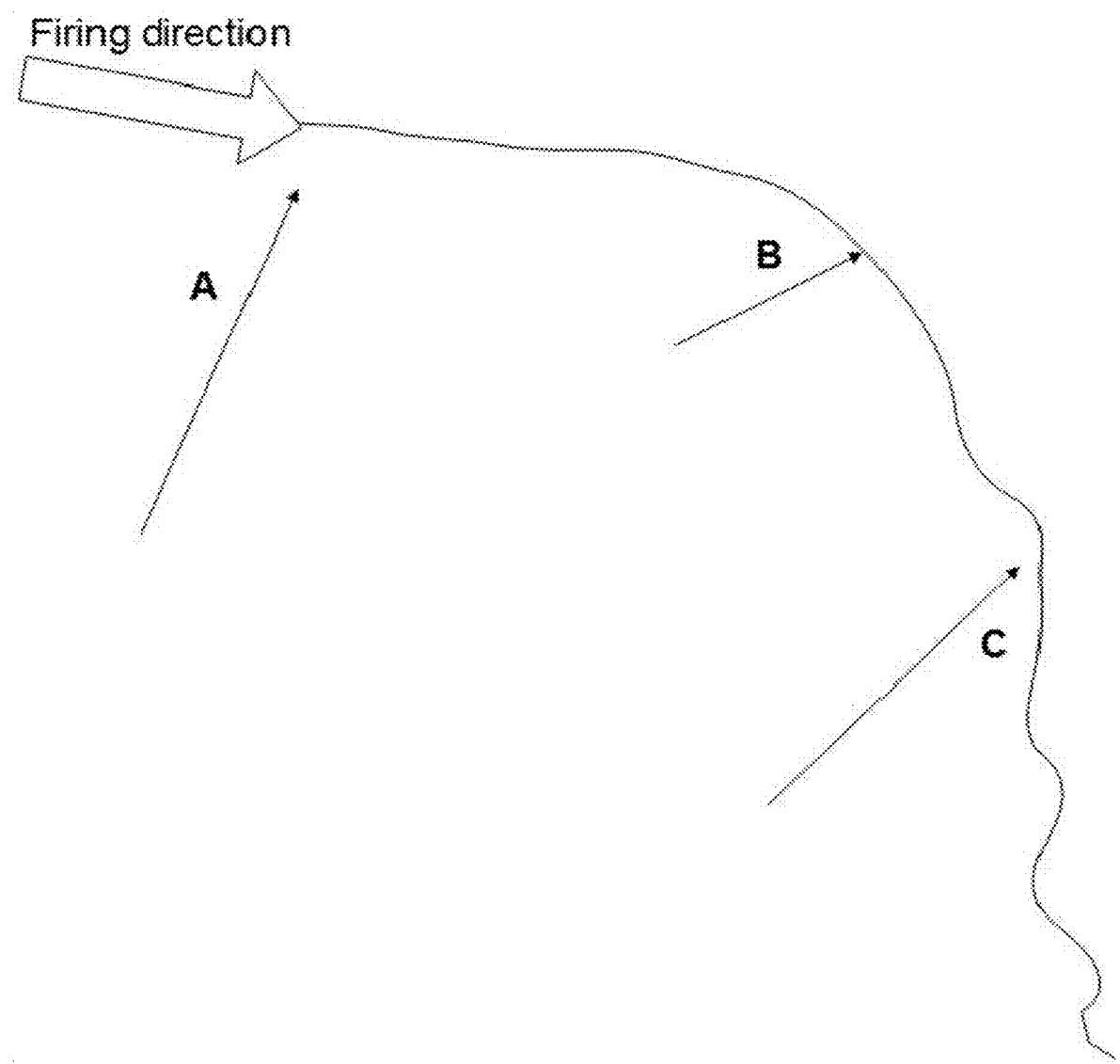
FIG. 4c aka Slide 7 shows no wind e.g. shows a typical streamer trajectory when wind=0 kph.

FIG. 4c aka Slide 7 shows no wind e.g. shows a typical streamer trajectory when wind=0 kph. As shown, in stage c, free-fall occurs and the streamers fall slowly to the ground.

In FIGS. 5-7 it is seen that under windy conditions the fully-unraveled streamers drift sideways with the wind. The two dashed lines and finally the solid line respectively represent the streamers at three different moments M, illustrating this drifting.

Any or all of the following operations 5-90 may be performed in any embodiment of the present invention.

5: optional set-up experiments to determine parameters e.g. some or all of a. select streamer material that tangles with target drone propellers rather than being torn thereby. For example, paper streamers are often torn by the propellers rather than tangling therewith.

b. determine time required for roll of streamers to unroll (depends inter alia on streamer material e.g. paper streamer rolls unravel almost immediately after they are fired)

c. fire cannons of different length, T times, under controlled conditions simulating field conditions—select the cannon whose scattering pattern repeats most reliably over the T times d. determine firing distance from target (alternatively, a suitable model of streamer movement may be used to compute firing distance e.g. phases may be defined such that streamer motion is generally uniform within those phases e.g. phase i—from ejection of streamer roll from barrel and until streamers unravel, phase ii in which streamers' air resistance is negligible relative to horizontal velocity component, and phase iii—free fall (with air resistance)

e. Retreat distance may be selected e.g. subject to empirical pre-testing including, say:
   imaging and measuring the size of the streamer cloud, and/or
   detecting free-fall based on collected visual data, comparing to true free fall data during pre-tests and determine reliability of free-fall detection f. determine time window s for operation 90 below 10: provide ground station, interceptor drone faster than expected target drones, with front-facing camera mounted thereupon and non-paper streamer cannon aboard interceptor drone, mounted (typically fixed so as not to add drag) to fire d degrees below horizontal e.g. as described below 20: Ground station scans for drones in protected area, typically using conventional techniques.

30: if target drone is detected, ground station computes anticipated target velocity and/or position, interceptor drone/s is/are dispatched in direction of target drone typically flying faster than the target drone or at their maximal speed. According to certain embodiments, if threat is found to be too far and/or too fast relative to threshold values, the interceptor drone may not be launched.

40: Interceptor flies toward the ground-station reported anticipated target position (which may, say, be 1-2 km away from launch position) lower than target if possible, seeking target with interceptor's onboard camera. During flight, interceptor seeks the target with its onboard camera, and adjusts interceptor trajectory to take into account target movement and heading changes.

Typically, if the interceptor and the target fly in the same direction, the relative velocity is small such that the target is almost stationary in the time-window during which firing occurs.

50: When target is found, interceptor predicts anticipated target trajectory and, typically, using wind conditions detected onboard, computes firing position (suitable interceptor-target distance) accordingly, assuming firing angle of d degrees below horizontal where d is typically 15-30 degrees. Horizontal (as illustrated) i.e. d=0 is also possible e.g. in conditions of little or no wind, and assuming the target's heading does not change as the target flies. Firing position is typically computed to be as close as possible to the target given the constraint that the streamer rolls must have time (the time being dependent on the wind speed and on the target drone speed) to unravel. It is appreciated that if the streamer rolls do not unravel, the streamers may simply bypass the target, whereas if the streamer rolls unravel far from the target, the streamers may spread too wide, due to their scattering pattern (which is typically large relative to target size), to intercept the target. A position just far enough away for streamers to unravel, is also far enough to allow the interceptor to escape, at least in most cases.

According to certain embodiments, firing occurs at an almost horizontal angle e.g. as described herein, from a point which is slightly higher than the target drone and which is so distanced from the target drone that many or most fired streamers fall generally vertically onto the target, when they reach the target. Pre-testing or analysis may be used to select the distance; a tested distance is deemed too close if streamers are still flying horizontally, whereas a tested distance is deemed too far if the streamers fail to reach the target, and instead fall below the target before they have reached the target's horizontal position. It is appreciated that even by trial and error, a suitable range of distances may be determined.

According to certain embodiments, a firing angle slightly below horizontal is employed, because the scattering is thereby rendered more controllable relative to other orientations. Directly firing at the target using slight angle downwards typically guarantees minimum ribbon scattering and shortest time-to-impact relative to other orientations. The initial horizontal velocity is high relative to other orientations, such that the streamers travel a relatively long way through the air i.e. until drag stops them. It is appreciated that when they are fired, the streamers are typically rolled hence have more momentum than an unraveled streamer, since their mass is concentrated initially. As each streamer unwraps, the streamer is more and more affected by air resistance and drag. If the interceptor drone fires straight upwards, the target typically will be missed. If the interceptor fires slightly above the horizontal, there will be a wait before the streamers start falling down on the target, which is undesirable because, as more time elapses, predictability lessens. If the interceptor fires horizontally, there is a concern that streamers may be "wasted", flying above or below the target, since the visible end of the target is its side, smaller surface. If the interceptor fires slightly below the horizontal, the end of the target visible to the interceptor is the target drone's main flat surface which has wider dimensions, hence is more vulnerable; more propellers e.g. all propellers, are within the trajectory of the streamers. Also, streamers' flight time is shortened since substantially all energy provided by the cannon yields velocity toward the target.

According to certain embodiments, the interceptor is controlled to fire from above i.e. not entirely horizontally, because it is typically not known how low the target flies. If the interceptor fires upwards-energy is wasted on vertical motion, and also time elapses until the streamers start falling down on the target, so firing upward adds uncertainty and/or utilizes more time allowing the target a chance to evade. Typically, when the interceptor is trying to visually detect the target, the interceptor is controlled to fly lower than the target so the target can easily be detected on the sky background that is visible when a target is imaged from below. Typically, the interceptor is operative for, at least sometimes, shooting with-the-wind.

60: As interceptor approaches target, interceptor ascends, so as to fly higher than target, rather than lower 70: Interceptor's streamer cannon fires at target typically immediately upon arriving at the firing position, using firing angle which is horizontal or d degrees below horizontal. When firing, aim at any point on the target, such as but not limited to the target center. Getting one propeller tangled is typically almost as effective as getting all propellers tangled, since most drones cannot stabilize if one motor is not operating, and streamer scatter is typically large relative to target diameter.

80: Interceptor brakes and retreats while continuing to track target using interceptor's onboard camera, including determining whether a hit (downward plummet of the target) has occurred Retreat distance is typically selected to be just enough to avoid entering the streamer cloud and/or just enough to allow the onboard camera to collect enough visual data to evaluate the target state (free fall detected by, say, comparing target's position in consecutive images thereof indicates a hit, otherwise no-hit) using the onboard camera.

It is appreciated that the vertical field of view is typically limited; if the distance to the target is too small, the target may be out of frame, and distancing the interceptor from the target restores the target to the frame.

Typically, the interceptor drone moves forward during the shooting, and backward force is applied to brake the interceptor, thereby to prevent its entry into the streamer cloud or cone. For example, if the interceptor drone is traveling at 20 m/s (72 km/h), 0.5 sec may elapse before the interceptor is within the "danger zone" of the streamers. As a precaution, the interceptor may quickly ascend to an altitude higher than the streamer cloud or cone, to be on the safe side.

90: If no hit is detected within time window of s seconds by ground station and/or interceptor, repeat operations 50-80. Typically, s is in the order of 2-6 seconds.

According to some embodiments, the firing velocity is constant (the cannon has a fixed velocity) and the firing angle is predetermined if the cannon is fixedly mounted on the drone), hence what is selected in real time is only the firing position.

It is appreciated that set-up experiments of operation 5, typically with plural categories of wind e.g. 2, or 3 or 4 or 10, are but one embodiment. Alternatively, for example, a formula may be generated which, given wind speed, computes suitable a firing position, including suitable firing distance.

Experiment results may be used to define suitable cut-off points between low, medium and high categories of wind, e.g. such that a recommended firing position works for all wind velocities within a given category of wind.

Such experiments aka trials may be conducted at various wind speeds e.g. on windy days and on calm days. In initial experiments, cannons may be fired manually, and results imaged, to deduce possible firing distances while firing from the air. Trials may include shooting videos e.g. from above (using a third drone, i.e. neither interceptor nor target), and one from the side (perpendicular to the firing line. The video may then be analyzed to determine the distance to which streamers flew in comparison to known distances in the frame.

Videos of set-up experiments are useful in determining, in advance, how far streamers go, the scattering angle (the "head angle of the cone" shape), characteristics of the trajectory including at which stage the streamers begin to fall vertically, and suitable distance for firing at a target drone. For example, a distance may be selected which places the target at the center of the "streamer shower."

According to certain embodiments, the interceptor approaches the target in the wind-direction e.g. if wind is blowing south-to-north (s to n), approach target from south. According to certain embodiments, the interceptor is operative to follow the target e.g. even if wind ifs to n, if the target is moving, say, w to e, the interceptor may approach the target from the west by following the target from behind.

According to certain embodiments, if the target is moving fast, and the wind is low, the interceptor may dog-chase the target, e.g. if the target moves s to n, the interceptor may also fire in this direction. If the wind is high and the target is slow, the interceptor may fire with the wind. If the target is also "moving with the wind", the interceptor follows the target from behind until the interceptor eventually fires. If the target is "fast and flying" into the wind e.g. the wind is s to n, and the target flies n to s, the interceptor may for example fire from the side, slightly in front of the target path, so the target flies toward the streamer cloud. If the target flies, say, w to e, and the wind is s to n (or any 90 degree difference in direction), the interceptor may chase the target w to e, but fire slightly south of the target, so the wind pushes the streamers to the target.

It is appreciated that flying directly over the target, if the target itself is moving, typically provides no slacks. If the system spreads a cloud of ribbons in front of the target, this implies waiting for the target to pass through this cloud which grants the operator of the target drone more time to react than other firing processes described herein. Therefore, according to certain embodiments, rather than firing from above, the firing position, firing velocity and firing angle are selected to ensure that the streamers fall vertically or diagonally onto the target.

A particular advantage of certain embodiments is that firing streamers produces a cloud or cone of elongate agents that the target e.g. that propellers can collide with, making accurate maneuvers unnecessary e.g. as opposed to prior art wire solutions which may require the interceptor to hover directly over the target and/or employ a sophisticated control loop and maneuver system.

A particular advantage of certain embodiments is that the firing event is very short e.g. less than a second, where speed of approach is, say, about 10-20 m/s, such that only high "situational awareness" by the (typically remotely deployed) target operator might give the target operator enough time to understand the threat and respond.

Typically, the remotely operated drone is either autonomously maneuvered, using GPS or visual guidance, making the target less aware of incoming threats, or visually steered by a remote operator, again making the target vulnerable, due to operator limitations e.g. lack of attention.

It is appreciated that terminology such as "mandatory", "required", "need" and "must" refer to implementation choices made within the context of a particular implementation or application described herewithin for clarity and are not intended to be limiting since in an alternative implementation, the same elements might be defined as not mandatory and not required, or might even be eliminated altogether.

Components described herein as software may, alternatively, be implemented wholly or partly in hardware and/or firmware, if desired, using conventional techniques, and vice-versa. Each module or component or processor may be centralized in a single physical location or physical device or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations as appropriate; machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order i.e. not necessarily as shown, including performing various operations in parallel or concurrently rather than sequentially as shown; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

The system may, if desired, be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein may be deployed in a cloud environment. Clients e.g. mobile communication devices such as smartphones may be operatively associated with but external to the cloud.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Any "if-then" logic described herein is intended to include embodiments in which a processor is programmed to repeatedly determine whether condition x, which is sometimes true and sometimes false, is currently true or false and to perform y each time x is determined to be true, thereby to yield a processor which performs y at least once, typically on an "if and only if" basis e.g. triggered only by determinations that x is true and never by determinations that x is false.

Features of the present invention, including operations, which are described in the context of separate embodiments, may also be provided in combination in a single embodiment. For example, a system embodiment is intended to include a corresponding process embodiment and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly although not limited to those described in the Background section or in publications mentioned therein.

Conversely, features of the invention, including operations, which are described for brevity in the context of a single embodiment or in a certain order may be provided separately or in any suitable subcombination, including with features known in the art (particularly although not limited to those described in the Background section or in publications mentioned therein) or in a different order. "e.g." is used herein in the sense of a specific example which is not intended to be limiting. Each method may comprise some or all of the operations illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, Smart Phone (e.g. iPhone), Tablet, Laptop, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

The invention claimed is:

1. A system operative to down a target drone having propellers deployed along a perimeter p, the system comprising:
   a processor-controlled interceptor drone bearing at least one processor-controlled flexible elongate intercepting agent cannon and at least one onboard camera; and
   an onboard processor operative to receive sensed wind conditions and to determine a firing distance d, between the interceptor drone and the target drone, given a firing angle A, wherein the firing distance d is:
   pre-known, given at least wind conditions, to be large enough to allow at least a first predetermined amount of flexible elongate intercepting agents e.g. streamer rolls each having a total length, which are fired by the cannon to each unravel to at least a predetermined extent before the streamer rolls reach the target drone; and/or
   pre-known, given at least wind conditions, to be small enough to result in less than a further predetermined amount of unraveled streamers scattering distally in excess of said perimeter,
   and wherein the onboard processor is configured to track the target drone using imagery generated by the onboard camera including at least once, when said wind conditions exist,
   guiding the interceptor drone to a firing position whose distance from the target drone is d, and
   commanding the cannon to fire at firing angle A, once said firing position is achieved,
   thereby to use the flexible elongate intercepting agent to down target drones.

2. A system according to claim 1 wherein said onboard processor determines firing distance d by accessing a memory which stores at least one distance d predetermined, for at least given wind conditions and a predetermined firing angle, to be:
   large enough to allow at least a first predetermined percentage of streamer rolls fired by the cannon to unravel to at least a second predetermined percentage of said total length of the steamer rolls before the streamer rolls reach the target; and/or
   small enough to result in less than a third predetermined percentage of unraveled streamers scattering distally in excess of said perimeter,
   and wherein the cannon fires at said predetermined firing angle.

3. A system according to claim 1 wherein the firing angle is always at least zero degrees below the horizontal.

4. A system according to claim 1 wherein the firing angle is, for at least some missions, 15-25 degrees below the horizontal.

5. A system according to claim 1 wherein the firing angle is constant.

6. A system according to claim 1 wherein the interceptor agent comprises a streamer.

7. A system according to claim 1 wherein said first predetermined amount comprises a percentage p1 within a 70-90% range.

8. A system according to claim 1 wherein the predetermined extent comprises a percentage p2 within a 45-75% range, of a streamer roll's total length.

9. A system according to claim 1 wherein the further predetermined amount comprises a percentage p3 within a 5-30% range.

10. A system according to claim 1 and wherein said wind conditions comprises a wind velocity vector.

11. A system according to claim 1 and wherein the cannon is loaded with rolled flexible elongate intercepting agents.

12. A system according to claim 1 and wherein the rolled agents have a diameter and wherein the cannon's barrel has a diameter which exceeds the diameter of the rolled agents thereby to introduce distal or lateral scatter of the elongate agents about an axis defined by the cannon's barrel.

13. A system according to claim 1 and wherein the processor is configured to track the target drone using imagery generated by the onboard camera including, when said wind conditions exist, guiding the interceptor drone to a firing position whose distance from the target drone is d, and commanding the cannon to fire at firing angle A, once said firing position is achieved and repeating said guiding and commanding if the target drone is not downed.

14. A method operative to down a target drone having propellers, the method comprising:
   providing a processor-controlled interceptor drone bearing at least one processor-controlled flexible elongate intercepting agent cannon and at least one onboard camera; and using an onboard processor operative to receive sensed wind conditions and to determine a firing distance d, between the interceptor drone and the target drone, given a firing angle A, wherein the firing distance d is:
pre-known, given at least wind conditions, to be large enough to allow at least a first predetermined amount of flexible elongate intercepting agents e.g. streamer rolls each having a total length, which are fired by the cannon to each unravel to at least a predetermined extent before the streamer rolls reach the target drone; and/or
pre-known, given at least wind conditions, to be small enough to result in less than a further predetermined amount of unraveled streamers scattering distally in excess of a perimeter about which propellors are deployed,
and wherein the onboard processor is configured to track the target drone using imagery generated by the onboard camera including at least once, when said wind conditions exist,
guiding the interceptor drone to a firing position whose distance from the target drone is d, and
commanding the cannon to fire at firing angle A, once said firing position is achieved,
thereby to use a flexible elongate intercepting agent to down target drones.

15. A computer program product, comprising a non-transitory tangible computer readable medium having computer readable program code embodied therein, said computer readable program code adapted to be executed to implement a method operative to down a target drone having propellers, said method comprising the following operations:

providing a processor-controlled interceptor drone bearing at least one processor-controlled flexible elongate intercepting agent cannon and at least one onboard camera; and
using an onboard processor operative to receive sensed wind conditions and to determine a firing distance d, between the interceptor drone and the target drone, given a firing angle A, wherein the firing distance d is:
pre-known, given at least wind conditions, to be large enough to allow at least a first predetermined amount of flexible elongate intercepting agents e.g. streamer rolls each having a total length, which are fired by the cannon to each unravel to at least a predetermined extent before the streamer rolls reach the target drone; and/or
pre-known, given at least wind conditions, to be small enough to result in less than a further predetermined amount of unraveled streamers scattering distally in excess of a perimeter about which propellors are deployed,
and wherein the onboard processor is configured to track the target drone using imagery generated by the onboard camera including at least once, when said wind conditions exist,
guiding the interceptor drone to a firing position whose distance from the target drone is d, and
commanding the cannon to fire at firing angle A, once said firing position is achieved,
thereby to use a flexible elongate intercepting agent to down target drones.

* * * * *